United States Patent
Jiang et al.

(10) Patent No.: US 12,337,359 B2
(45) Date of Patent: Jun. 24, 2025

(54) METHOD AND APPARATUS FOR DETECTING WAFER CLEANING ANOMALIES

(71) Applicant: CHANGXIN MEMORY TECHNOLOGIES, INC., Hefei (CN)

(72) Inventors: Guobiao Jiang, Hefei (CN); Xiaojun Liu, Hefei (CN)

(73) Assignee: CHANGXIN MEMORY TECHNOLOGIES, INC., Hefei (CN)

( * ) Notice: Subject to any disclaimer, the term of this patent is extended or adjusted under 35 U.S.C. 154(b) by 568 days.

(21) Appl. No.: 17/699,829

(22) Filed: Mar. 21, 2022

(65) Prior Publication Data

US 2022/0323999 A1 Oct. 13, 2022

(30) Foreign Application Priority Data

Mar. 30, 2021 (CN) .......................... 202110340929.9

(51) Int. Cl.
*B08B 3/08* (2006.01)
*B08B 13/00* (2006.01)
*G06T 7/00* (2017.01)
*G06T 7/13* (2017.01)

(52) U.S. Cl.
CPC ................ *B08B 3/08* (2013.01); *B08B 13/00* (2013.01); *G06T 7/0008* (2013.01); *G06T 7/13* (2017.01); *G06T 2207/30164* (2013.01)

(58) Field of Classification Search
CPC ......... B08B 3/08; B08B 13/00; G06T 7/0008; G06T 7/13; G06T 2207/30164; H01L 21/67253; H01L 21/02043; H01L 21/02082; H01L 21/67051

See application file for complete search history.

(56) References Cited

U.S. PATENT DOCUMENTS

| 10,269,076 B1* | 4/2019 | Ton-That ............. G06Q 50/163 |
| 2004/0176925 A1* | 9/2004 | Satoh .................... G01B 11/002 |
| | | 702/150 |
| 2009/0279772 A1* | 11/2009 | Sun ......................... G06T 7/001 |
| | | 382/141 |
| 2015/0194301 A1 | 7/2015 | Uemura et al. |
| 2017/0090305 A1* | 3/2017 | Uemura ................. B08B 3/024 |

(Continued)

FOREIGN PATENT DOCUMENTS

| CN | 103048330 A | 4/2013 |
| TW | 201538242 A | 10/2015 |

*Primary Examiner* — Amara Abdi
(74) *Attorney, Agent, or Firm* — Kilpatrick Townsend & Stockton LLP

(57) ABSTRACT

A method for detecting wafer cleaning anomalies includes: capturing a wafer cleaning video in real time through each of a plurality of cameras of cleaning machines, each camera corresponds to a respective cleaning chamber of one of the cleaning machines, and each cleaning chamber contains a nozzle; performing image processing on each frame of image contained in the wafer cleaning video to obtain characteristics of contact between a cleaning water column dispensed from the nozzle and a wafer in the image, and determining through the characteristics of contact whether the nozzle has an anomaly; and when a target nozzle having the anomaly is detected, determining anomaly positioning information of the target nozzle, and performing anomaly early-warning by using the anomaly positioning information.

8 Claims, 20 Drawing Sheets

A wafer cleaning video is captured in real time through each of multiple cameras of cleaning machines, where each camera corresponds to a respective cleaning chamber of one of the cleaning machine tables, and each cleaning chamber contains a nozzle — S310

Image processing is performed on each frame of image contained in the wafer cleaning video to obtain characteristics of contact between a cleaning water column dispensed from the nozzle and a wafer in the image, and it is determined through the characteristics of contact whether the nozzle has an anomaly — S320

When a target nozzle having the anomaly is detected, anomaly positioning information of the target nozzle is determined, and anomaly early-warning is performed by using the anomaly positioning information — S330

(56) References Cited

U.S. PATENT DOCUMENTS

2018/0242827 A1* 8/2018 Michihata ............ H04N 23/741
2018/0323085 A1* 11/2018 Sano ................ H01L 21/67051
2021/0256717 A1* 8/2021 Lin ........................ G06T 7/136

* cited by examiner

METHOD AND APPARATUS FOR DETECTING WAFER CLEANING ANOMALIES

CROSS-REFERENCE TO RELATED APPLICATION

The application claims priority to Chinese Patent Application No. 202110340929.9, filed on Mar. 30, 2021, the disclosure of which is hereby incorporated herein by reference in its entirety.

BACKGROUND

Each component and connection line in an integrated circuit are quite microscopic, if they are contaminated by dust particles and metals during the manufacturing process, it is very easy to cause damage to circuit functions in a wafer and cause short circuit or open circuit, etc., resulting in the failure of the integrated circuit. Therefore, it is necessary to perform cleaning before the manufacturing operation. Wafer cleaning refers to the effective use of chemical solutions or gases to remove impurities such as fine dusts and metal ions from the wafer without destroying the surface characteristics and electrical characteristics of the wafer. During the process of wafer cleaning, if a cleaning device malfunctions, it is only possible to manually investigate the reasons one-by-one, which is labor intensive. For example, when a nozzle position is shifted, it may cause particles to accumulate in a center area of the wafer, resulting in that lines are not etched apart, as shown in FIG. 1, thereby affecting the conductivity of a chip.

It is to be noted that the information disclosed in the BACKGROUND is intended only to enhance the understanding of the context of the disclosure, and may therefore include information that does not constitute the prior art known to those of ordinary skill in the art.

SUMMARY

The disclosure relates to the technical field of chip manufacturing, and more particularly, to a method for detecting wafer cleaning anomalies, an apparatus for detecting wafer cleaning anomalies, an electronic device, and a computer-readable medium.

An object of embodiments of the disclosure is to provide a method for detecting wafer cleaning anomalies, an apparatus for detecting wafer cleaning anomalies, an electronic device, and a computer-readable medium, capable of automatically monitoring a cleaning device and detecting the anomalies of the nozzles in time, thereby improving chip yield.

Other characteristics and advantages of the disclosure will be apparent through detailed description below, or partly learned through practice of the disclosure.

According to a first aspect of the embodiments of the disclosure, a method for detecting wafer cleaning anomalies is provided, which may include the following operations. A wafer cleaning video is captured in real time through each of multiple cameras of cleaning machines. Each camera corresponds to a respective cleaning chamber of one of the cleaning machines, and each cleaning chamber contains a nozzle. Image processing is performed on each frame of image contained in the wafer cleaning video to obtain characteristics of contact between a cleaning water column dispensed from the nozzle and a wafer in the image, and it is determined through the characteristics of contact whether the nozzle has an anomaly. When a target nozzle having the anomaly is detected, anomaly positioning information of the target nozzle is determined, and anomaly early-warning is performed by using the anomaly positioning information.

According to a second aspect of the embodiments of the disclosure, an apparatus for detecting wafer cleaning anomalies is provided, which may include a video capture circuit, an image processing circuit and an anomaly positioning circuit. The video capture circuit is configured to capture a wafer cleaning video in real time through each of multiple cameras of cleaning machines. Each camera corresponds to a cleaning chamber of one of the cleaning machines, and each cleaning chamber contains a nozzle. The image processing circuit is configured to perform image processing on each frame of image contained in the wafer cleaning video to obtain characteristics of contact between a cleaning water column dispensed from the nozzle and a wafer in the image, and determine through the characteristics of contact whether the nozzle has an anomaly. The anomaly positioning circuit is configured to determine, when a target nozzle having the anomaly is detected, anomaly positioning information of the target nozzle, and perform anomaly early-warning by using the anomaly positioning information.

According to a third aspect of the embodiments of the disclosure, an electronic device is provided. The electronic device may include: a processor; and a memory configured to store instructions executable by the processor. The processor is configured to: capture a wafer cleaning video in real time through each of a plurality of cameras of cleaning machines, wherein each camera corresponds to a respective cleaning chamber of the one of the cleaning machines, and each cleaning chamber contains a nozzle; perform image processing on each frame of image contained in the wafer cleaning video to obtain characteristics of contact between a cleaning water column dispensed from the nozzle and a wafer in the image, and determine through the characteristics of contact whether the nozzle has an anomaly; and when a target nozzle having the anomaly is detected, determine anomaly positioning information of the target nozzle, and perform anomaly early-warning by using the anomaly positioning information.

In the method for detecting wafer cleaning anomalies, the apparatus for detecting wafer cleaning anomalies, the electronic device, and the computer-readable medium provided in the embodiments of the disclosure, on the one hand, wafer cleaning videos of the cleaning machine are captured by the cameras, and it is determined through the recognition of wafer cleaning videos whether the nozzles of the cleaning machines have any anomalies, so as to automatically detect the target nozzles having the anomalies, thereby avoiding the waste of manpower and time caused by manual troubleshooting and improving the efficiency of troubleshooting. On the other hand, according to anomaly positioning information of the target nozzles having the anomalies, faults may be handled in time to prevent more yield loss. Furthermore, the embodiments of the disclosure can conduct a more comprehensively detection of the cleaning machines, thereby enabling precise control of the wafer cleaning process, and facilitating the improvement of chip yield.

It is to be understood that the above general description and the following detailed description are intended to be illustrative and not restrictive. The disclosure cannot be limited.

BRIEF DESCRIPTION OF THE DRAWINGS

The accompanying drawings herein are incorporated into and constitute a part of the specification, illustrate embodiments consistent with the disclosure and are used in conjunction with the specification to explain the principle of the present disclosure. It will be apparent that the accompanying drawings in the following description are only some embodiments of the present disclosure, and other accompanying drawings may be obtained by those of ordinary skill in the art according to these accompanying drawings without any creative effort. In the accompanying drawings.

DETAILED DESCRIPTION

Figure 1:
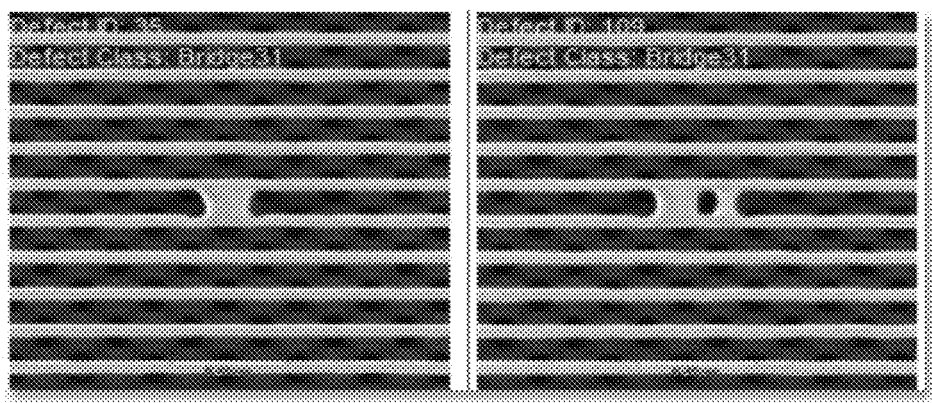
FIG. 1 schematically shows a schematic diagram of wafer cleaning anomalies according to BACKGROUND section.

Example implementations will now be described more fully with reference to the accompanying drawings. However, the exemplary implementations can be embodied in a variety of forms and should not be construed as being limited to the examples set forth herein. Rather, these implementations are provided so that the disclosure will be more comprehensive and complete, and the concepts of the exemplary implementations are conveyed to those skilled in the art in a comprehensive manner.

Furthermore, the described features, structures, or characteristics may be combined in any suitable manner in one or more embodiments. In the following description, numerous specific details are provided for fully understanding the embodiments of the disclosure. However, those skilled in the art will appreciate that the technical solution of the disclosure may be practiced without one or more of specific details, or other methods, components, apparatuses, operations, etc. may be employed. In other instances, well-known methods, apparatuses, implementations, or operations are not shown or described in detail to avoid obscuring aspects of the disclosure.

The block diagrams shown in the accompanying drawings are merely functional entities and do not necessarily have to correspond to physically separate entities. That is, the functional entities may be implemented in software form, or in one or more hardware modules or integrated circuits, or in different network and/or processor apparatuses and/or microcontroller apparatuses.

The flowcharts shown in the drawings are merely exemplary descriptions, do not have to include all the content and operations/operations, nor do they have to be performed in the order depicted. For example, some operations/operations may also be decomposed, while some operations/operations may be combined or partially combined, so that the order of actual execution may vary depending on the actual situation.

In this specification, the terms "one", "a/an", "this/the", "said", and "at least one" are used to indicate the presence of one or more elements/components, etc.; the terms "containing", "including", and "having" are used to indicate an open-ended inclusion, and to mean that additional elements/components, etc. may exist in addition to the listed elements/components/etc.; the terms "first", "second", "third", and the like are used as labels only, and are not intended to limit the number of objects thereof.

The exemplary implementations of the disclosure will be described in detail below with reference to the accompanying drawings.

Figure 2:
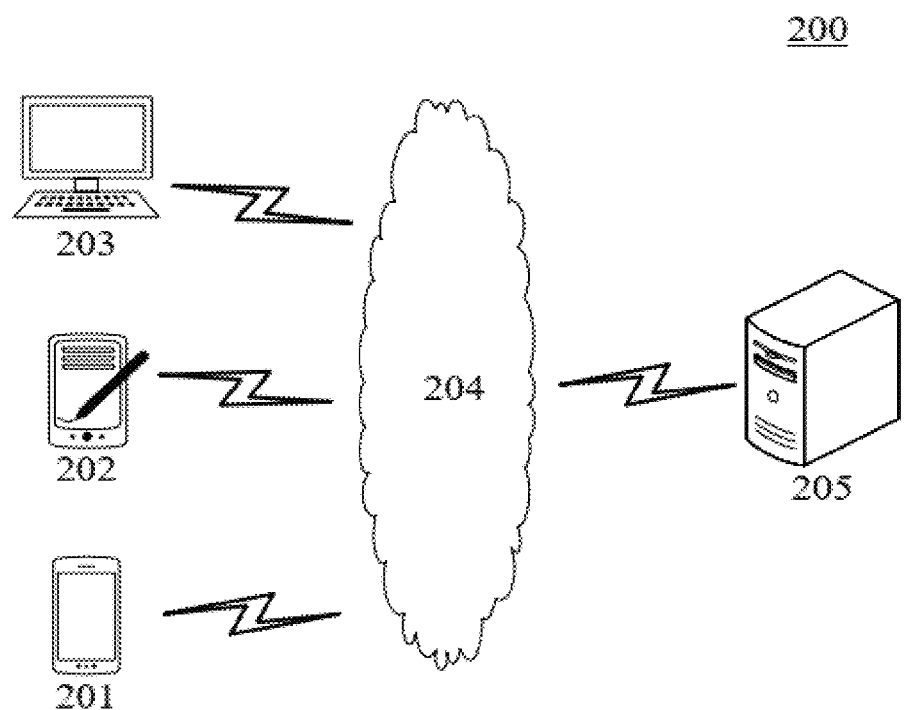
FIG. 2 schematically shows a schematic diagram of an exemplary system architecture applied to a method for detecting wafer cleaning anomalies or an apparatus for detecting wafer cleaning anomalies according to embodiments of the disclosure.

FIG. 2 shows a schematic diagram of system architecture of an exemplary application environment applicable to a method for detecting wafer cleaning anomalies or an apparatus for detecting wafer cleaning anomalies according to embodiments of the disclosure.

As shown in FIG. 2, a system architecture 200 may include one or more of terminal devices 201, 202, 203, a network 204, and a server 205. The network 204 serves as a medium for providing communication links between the terminal devices 201, 202, 203 and the server 205. The network 204 may include various connection types, such as wired, wireless communication links, or fiber optic cables.

Users may interact with the server 205 through the network 204 by using the terminal devices 201, 202, 203 to receive or send messages, etc. The terminal devices 201, 202, 203 may include various electronic devices having a display screen and supporting web browsing, such as computers, smart phones, pads, wearable devices, and virtual reality devices. The terminal devices 201, 202, 203 may also include various electronic devices with photographing and camera shooting functions, such as monitoring cameras, cameras, computers, smart phones, and wearable devices.

The server 205 may be a server providing various services, such as a backend management server providing support for apparatuses operated by users using the terminal devices 201, 202, 203. The backend management server may perform processing such as analysis on the received data such as a request, and feedback a processing result to the terminal devices.

It is to be understood that the number of terminal devices, networks and servers in FIG. 2 is merely illustrative. There may be any number of terminal devices, networks, and servers depending on the needs of the implementation. For example, the server 205 may be a server cluster composed of multiple servers, etc.

The method for detecting wafer cleaning anomalies provided by an embodiment of the disclosure is generally performed by the server 205, and accordingly, the apparatus for detecting wafer cleaning anomalies is generally arranged in the server 205. However, those skilled in the art will readily understand that the method for detecting wafer cleaning anomalies according to the embodiment of the disclosure may also be performed by the terminal devices 201, 202, 203, and accordingly, the apparatus for detecting wafer cleaning anomalies may also be arranged in the terminal devices 201, 202, 203. It is not particularly limited in the present exemplary embodiment.

Based on this, an embodiment of the disclosure provides a technical solution of a method for detecting wafer cleaning anomalies, which can automatically detect each wafer cleaning process, find anomalies and position them in time, so as to avoid the waste of manpower and time caused by manual troubleshooting.

Figure 3:
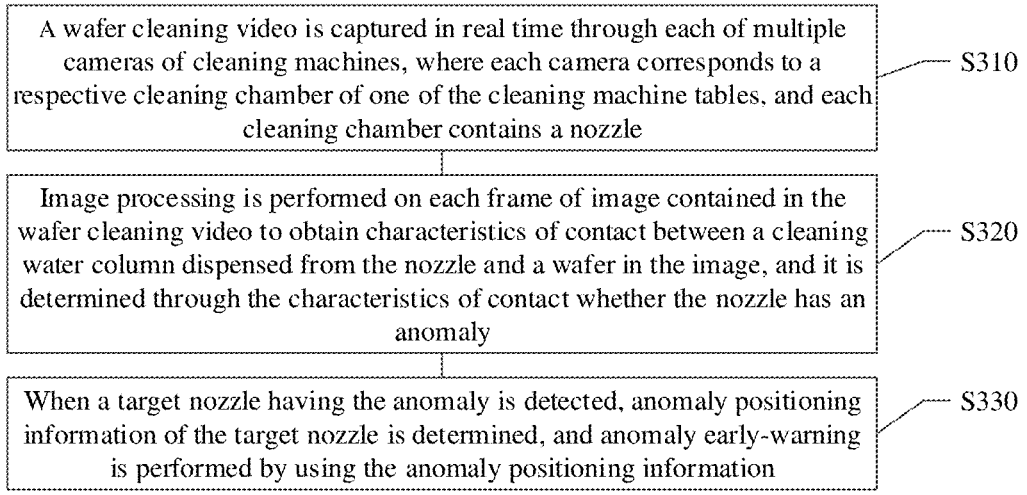
FIG. 3 schematically shows a flowchart of a method for detecting wafer cleaning anomalies according to an embodiment of the disclosure.

As shown in FIG. 3, the method for detecting wafer cleaning anomalies provided by an embodiment of the disclosure may include operations S310, S320, and S330.

At S310, a wafer cleaning video is captured in real time through each of multiple cameras of cleaning machines. Each camera corresponds to a respective cleaning chamber of one of the cleaning machines, and each cleaning chamber contains a nozzle.

At S320, image processing is performed on each frame of image contained in the wafer cleaning video to obtain characteristics of contact between a cleaning water column dispensed from the nozzle and a wafer in the image, and it is determined through the characteristics of contact whether the nozzle has an anomaly.

At S330, when a target nozzle having the anomaly is detected, anomaly positioning information of the target nozzle is determined, and anomaly early-warning is performed by using the anomaly positioning information.

In the method for detecting wafer cleaning anomalies provided by the present exemplary implementation, on the one hand, wafer cleaning videos of the cleaning machines are captured by the cameras, and it is determined through the recognition of the wafer cleaning videos whether the nozzles of the cleaning machines have any anomalies, so as to automatically detect the target nozzles having the anomalies, thereby avoiding the waste of manpower and time caused by manual troubleshooting and improving the efficiency of troubleshooting. On the other hand, according to anomaly positioning information of the target nozzles having the anomaly, faults may be handled in time to prevent more yield loss. Furthermore, the embodiments of the disclosure can conduct a more comprehensively detection of the cleaning machines, thereby enabling precise control of the wafer cleaning process, and facilitating the improvement of chip yield.

Next, various operations in the exemplary implementation are described in detail.

At S310, a wafer cleaning video is captured in real time through each of multiple cameras of cleaning machines. Each camera corresponds to a respective cleaning chamber of one of the cleaning machines, and each cleaning chamber contains a nozzle.

Wafer cleaning technologies can be broadly classified into two categories: wet cleaning and dry cleaning, where wet cleaning is the dominant method. Wet cleaning technology is a technology that uses chemical reactions to remove particles, photoresists, film, etc., so as to meet the requirements for silicon wafer cleaning. For wet cleaning, it has multiple cleaning machines, each cleaning machine may include multiple cleaning chambers, and a camera may be configured for each cleaning chamber to monitor cleaning pictures of the cleaning chamber. In the cleaning chamber, a mixed solution of chemical solvent and deionized water is dispensed from the nozzle to form a cleaning water column to rinse the wafer surface. The camera may be installed at a position facing the nozzle in the cleaning chamber, or a relative angle between the camera and the nozzle may be adjusted according to the requirements for the cleaning picture, so that the cleaning picture captured by the camera is complete and clear.

The wafer cleaning video includes multiple monitoring pictures and capture time corresponding to each frame of monitoring picture. A stream of the monitoring picture captured by the camera in real-time may be uploaded to a specified file directory and stored as wafer cleaning video. Moreover, the wafer cleaning videos of different cameras may be distinguished by identification information. The identification information may include an identifier of a corresponding camera, such as a camera ID, and may also include an identifier of a cleaning chamber, such as a cleaning chamber code. For example, each camera is configured in advance so as to mark the monitoring pictures with identification information, and upload them to a hard disk video recorder to store as a wafer cleaning video. All cameras may upload the monitoring pictures to the same hard disk, or each of the cameras may upload the monitoring pictures to different hard disks respectively and then the monitoring pictures are aggregated into a cluster via a switch for unified processing.

At S320, image processing is performed on each frame of image contained in the wafer cleaning video to obtain characteristics of contact between a cleaning water column dispensed from the nozzle and a wafer in the image, and it is determined through the characteristics of contact whether the nozzle has an anomaly.

The characteristics of contact may include a falling point of the cleaning water column on the wafer, or it may also include an angle formed by the cleaning water column with the wafer surface, or other features such as an image feature point, etc. The wafer cleaning video uploaded by each camera may be acquired from the corresponding file directory, so as to perform image processing on each frame of image in the video, and recognize the characteristics of contact between the cleaning water column dispensed from the nozzle and the wafer in the image. The characteristics of contact are used to determine whether the nozzle has an anomaly.

Figure 4:
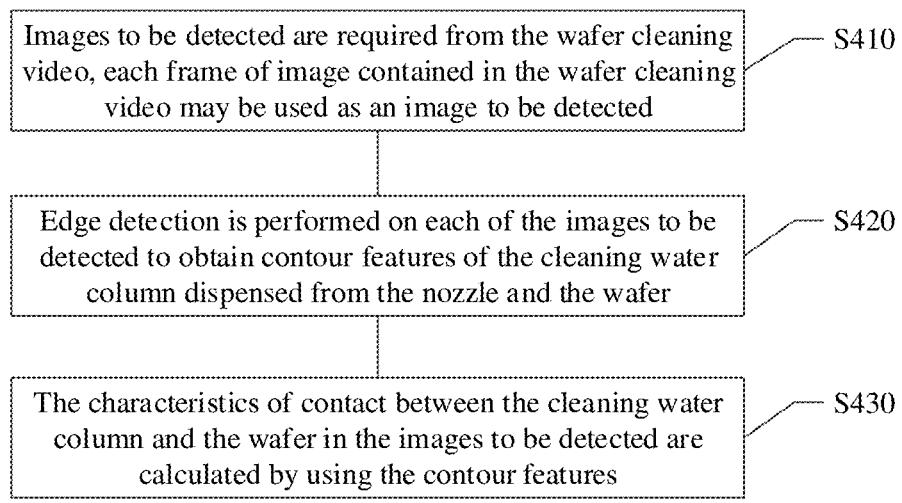
FIG. 4 schematically shows a flowchart of operations of image processing according to an embodiment of the disclosure.

In an exemplary implementation, the process of performing image processing on an image may include the following operations S410, S420, and S430, as shown in FIG. 4.

At S410, images to be detected are acquired from the wafer cleaning video. Each frame of image contained in the wafer cleaning video may be used as an image to be detected. In order to reduce the amount of calculation, frames may be extracted from the wafer cleaning video. For example, one frame of image is extracted every one second. The first frame of image, an image corresponding to a moment of 1 second, an image corresponding to a moment of 2 seconds, etc. in the wafer cleaning video are sequentially acquired, and the extracted images are taken as the images to be detected. Only the extracted images to be detected are subjected to image processing, an anomalous error may also be controlled within 1 second, the number of processed images can also be significantly reduced, and the efficiency can be improved. It is to be understood that in the present implementation, the images to be detected are extracted from the wafer cleaning video at an interval of 1 second, and in other implementations, the images to be detected may be extracted at other intervals, such as 0.5, 0.25, 2, or 3 seconds, which also fall within the scope of protection of the disclosure.

At S420, edge detection is performed on the images to be detected to obtain contour features of the cleaning water column dispensed from the nozzle and the wafer. The contour features may include contour information of the cleaning water column in the image to be detected and contour information of the wafer. Edge detection may be performed on the images to be detected by edge detection algorithms, such as a Sobel algorithm, a Canny algorithm or a Laplacian algorithm. The edge detection algorithms are technologies for detecting edge points of an image, which may calculate the change in brightness of pixel points in the image, and determine a pixel point with the greatest brightness change rate, i.e. an edge contour of an object. For example, edge detection is performed on the images to be detected through the canny algorithm, so as to extract the contour of the wafer and the contour of the cleaning water column in the image, and obtain the contour features of the image to be detected.

At S430, the characteristics of contact between the cleaning water column and the wafer in the images to be detected are calculated by using the contour features. When contour information of the cleaning water column and contour information of the wafer in the image to be detected are obtained, the two pieces of contour information may be used to calculate the characteristics of contact between the cleaning water column and the wafer, such as a relative angle, a contact area and a contact position. Illustratively, the characteristics of contact are obtained by calculating a slope of the cleaning water column in each image to be detected using the contour features.

Figure 5:
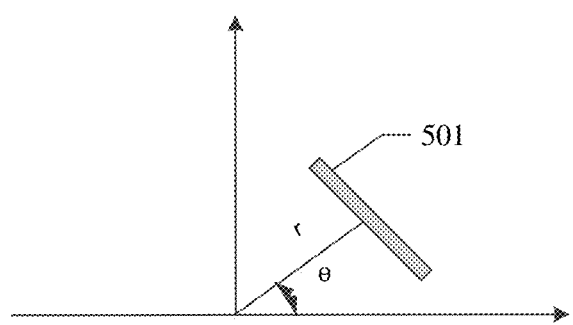
FIG. 5 schematically shows a schematic diagram of a process of calculating a slope according to an embodiment of the disclosure.

For example, Hough detection may be used to detect the slope of the cleaning water column according to the contour features in the image, and an OpenCV tool may perform Hough line detection on a line in the image, to output θ and r of the line, where θ is an angle of the line, and r is a distance from the line to an origin. Then the slope of the cleaning water column is tan θ. As shown in FIG. 5, 501 is a contour of a cleaning water column, the slope tan θ of the cleaning water column may be determined by Hough detection, and the OpenCV tool may output a value of tan θ.

Alternatively, the slope of the cleaning water column may also be detected by other means, for example, establishing a Cartesian coordinate system for the image to be detected. An x-plane of the coordinate system may be a plane where a wafer surface is located, and a y-plane is a plane perpendicular to the wafer surface. An angle of the cleaning water column in the Cartesian coordinate system with respect to the x-plane is calculated, so as to obtain a slope corresponding to the angle.

In an exemplary implementation, an actual falling point of the cleaning water column on the wafer in each image to be detected is calculated by using the contour features to obtain the characteristics of contact.

Figure 6:
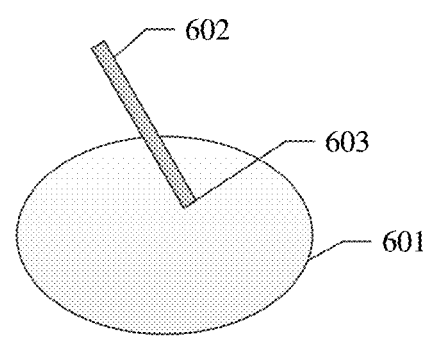
FIG. 6 schematically shows a schematic diagram of a process of calculating an actual falling point according to an embodiment of the disclosure.

The actual falling point refers to the position of a contact point between the cleaning water column and the wafer, such as the center of the wafer. For example, a corner detection algorithm may be used to detect a contact point between the cleaning water column and the wafer in each image to be detected, and determine the position of the contact point. Corner detection refers to detecting an intersection position of lines in the image, for example, detecting a position at a maximum or minimum gray level, for another example, detecting a position where a gradient satisfies a preset condition, etc. For example, the contour features of the image to be detected are as shown in FIG. 6. 601 is a contour of the wafer, 602 is a contour of the cleaning water column, and coordinates of the actual falling point 603 are determined through corner point detection.

Figure 7:
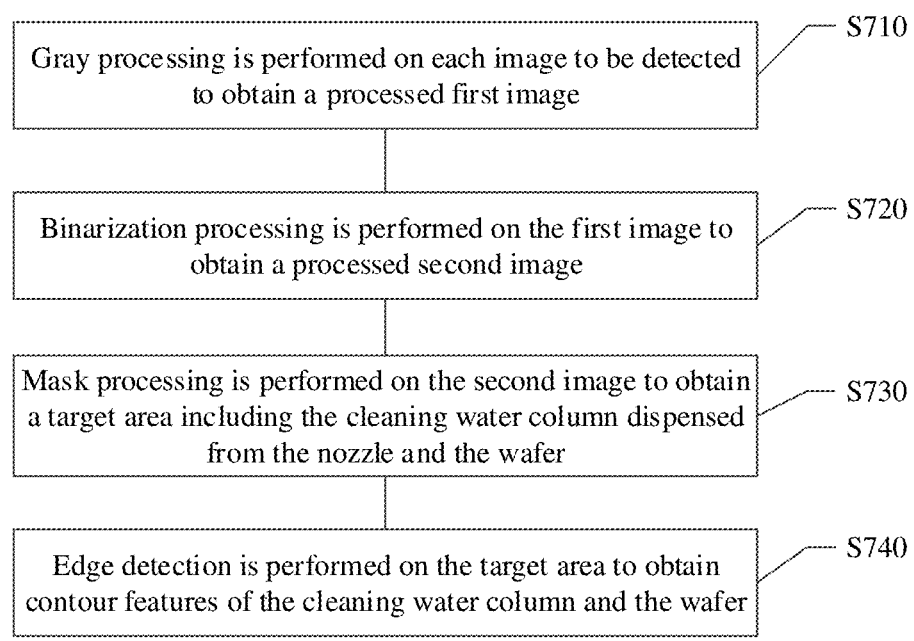
FIG. 7 schematically shows a flowchart of a method for detecting wafer cleaning anomalies according to an embodiment of the disclosure.

In an exemplary implementation, the following operations S710, S720, S730, and S740 may be specifically included in the edge detection of the images to be detected, as shown in FIG. 7.

At S710, gray processing is performed on each image to be detected to obtain a processed first image. Through the OpenCV tool, the image to be detected may be grayed, and a corresponding gray value is determined for each pixel in the image to be detected. RGB values of pixel points in the grayed image are the same, i.e. R=G=B. Therefore, the sum of the RGB values of the pixel points in the image to be detected may be calculated and divided by 3 to obtain the gray value. Using the gray values, each pixel point in the image to be detected is reassigned a value, so as to obtain a grayed first image.

At S720, binarization processing is performed on the first image to obtain a processed second image. Binarization refers to converting a gray value of a pixel point of an image to 0 (black) or 255 (white). After converting the gray value of each pixel point in the first image to 0 or 255, a second image may be obtained. For example, by determining a threshold, a gray value of a pixel point greater than the threshold is changed to 255, and a gray value of a pixel point less than the threshold is changed to 0. The threshold may be an average gray value of the first image, i.e. the sum of the gray values of all the pixel points divided by the number of pixel points; or, the threshold may be another value, such as a customized value, which is not particularly limited in the present implementation.

At S730, mask processing is performed on the second image to obtain a target area including the cleaning water column dispensed from the nozzle and the wafer. Mask processing refers to the process of controlling a processing area in an image by masking a second image with a selected image, pattern or object. A mask is a selected image, each pixel point in a mask image performs AND operation with a corresponding pixel point in the second image, and after the operation, a target area including the cleaning water column and the wafer may be obtained. The mask may be made in advance, and the range of a monitoring picture of the cleaning water column and the wafer may be determined according to a shooting angle of the camera to the nozzle, so that an area outside the range may be taken as the mask.

At S740, edge detection is performed on the target area to obtain contour features of the cleaning water column and the wafer. Compared with the edge detection of the whole image to be detected, the edge detection is performed only on the target area, which can significantly reduce the amount of calculation, thereby improving the calculation speed and obtaining the results quickly.

It is to be understood that the above image processing operations performed on the image to be detected may be deleted according to actual situations, or performed in another order, for example, firstly performing mask processing on the image to be detected to obtain a processing result and then performing edge detection to obtain the contour features of the cleaning water column and the wafer, and for another example, firstly performing gray processing on each image to be detected and then performing edge detection to obtain the contour features, etc. which is not limited thereto in the present implementation.

Figure 8:
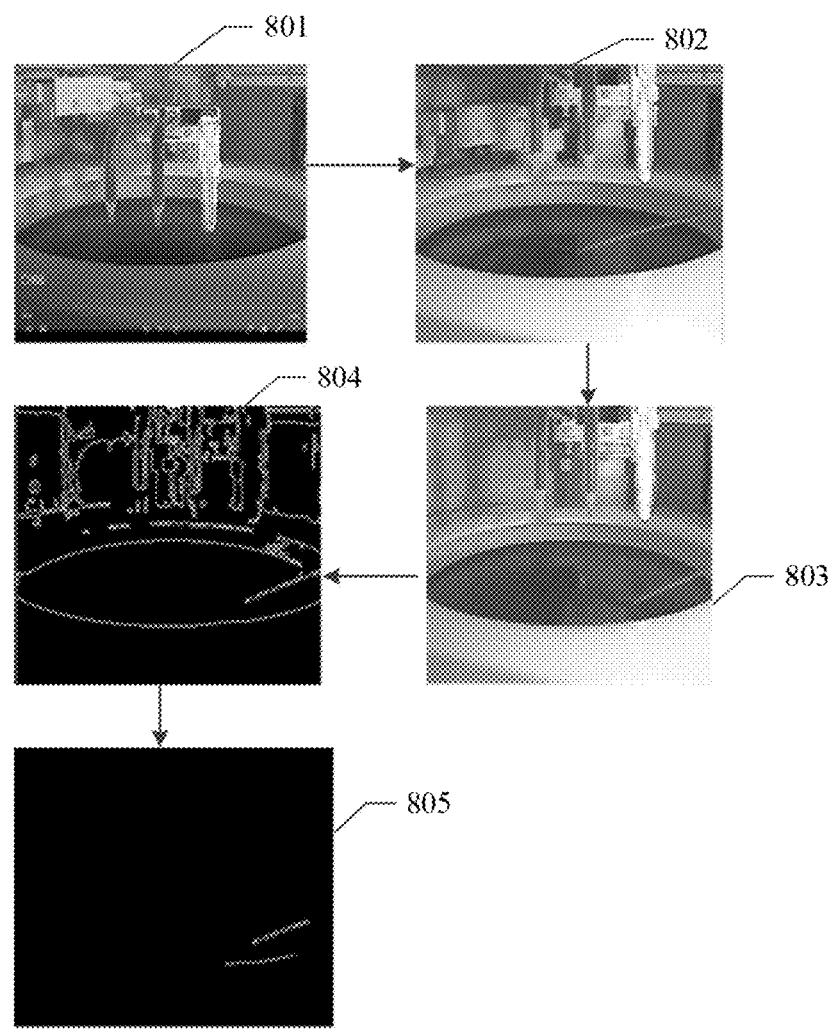
FIG. 8 schematically shows a schematic diagram of an image processing effect according to an embodiment of the disclosure.

FIG. 8 schematically shows a processing effect diagram of an image during image processing of a wafer cleaning video in the present implementation. As shown in FIG. 8, a frame of image 802 to be detected is extracted from a wafer cleaning video 801, the image 802 to be detected is firstly subjected to gray processing to obtain an image 803, the image 803 is then subjected to edge detection to obtain a contour feature image 804, the image 804 is then subjected to mask processing to obtain a contour feature image 805 of an area including a cleaning water column and a wafer, and the characteristics of contact are then calculated by using the contour feature image. In the present implementation, by performing image processing on the image to be detected, the characteristics of contact between the wafer and the cleaning water column can be automatically calculated through an algorithm, which improves the monitoring of the wafer cleaning process, thereby precisely controlling the cleaning process.

Figure 9:
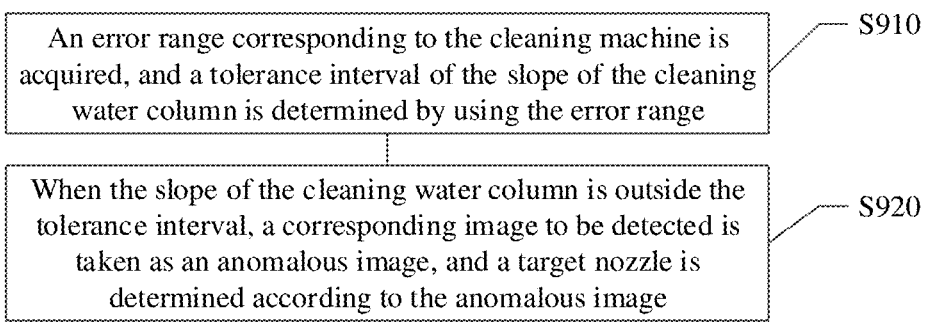
FIG. 9 schematically shows a flowchart of a method for detecting wafer cleaning anomalies according to an embodiment of the disclosure.

After the characteristics of contact between the cleaning water column and the wafer are calculated, it may be determined through the characteristics of contact whether the nozzle has an anomaly. Specifically, the characteristics of contact may include a slope of the cleaning water column, or an actual falling point of the cleaning water column on the wafer, or both the slope and the actual falling point. The process of determining through the slope whether the nozzle is anomalous may specifically include the following operations S910 and S920, as shown in FIG. 9.

At S910, an error range corresponding to the cleaning machine is acquired, and a tolerance interval of the slope of the cleaning water column is determined by using the error range. The positions of nozzles on different cleaning machines are different, and error range corresponding to each of the cleaning machines may be determined according to the position of the nozzle on the cleaning machine. The error range is an extreme position at which the cleaning water column dispensed from the nozzle can arrive, i.e. leftmost and rightmost boundaries from the center of the wafer. A slope is calculated by using the leftmost and rightmost boundaries, respectively, to obtain a tolerance interval.

At S920, when the slope of the cleaning water column is outside the tolerance interval, a corresponding image to be detected is taken as an anomalous image, and the target nozzle is determined according to the anomalous image.

After calculating the slope of the cleaning water column, it may be determined whether the slope is within the predetermined tolerance interval of the slope, if the slope is within the tolerance interval, it may be determined that the image to be detected has no anomaly, if the slope is not within the tolerance interval, it may be determined that the image to be detected is an anomalous image, and the nozzle corresponding to the anomalous image is a target nozzle.

Figure 10:
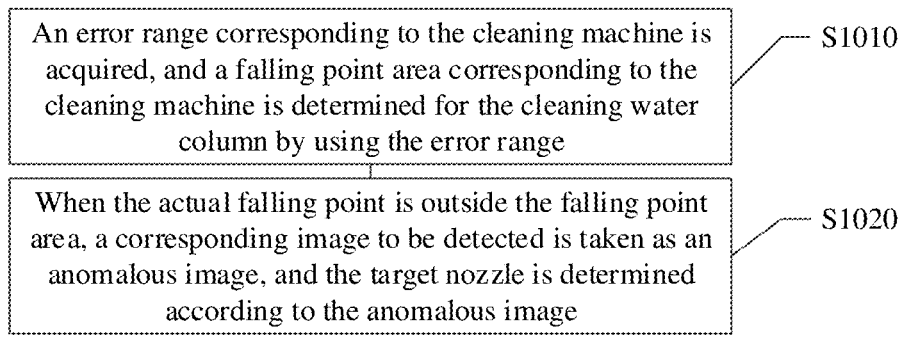
FIG. 10 schematically shows a flowchart of a method for detecting wafer cleaning anomalies according to an embodiment of the disclosure.

The process of determining through the falling point whether the nozzle is anomalous may specifically include the following operations S1010 and S1020, as shown in FIG. 10.

Figure 11:
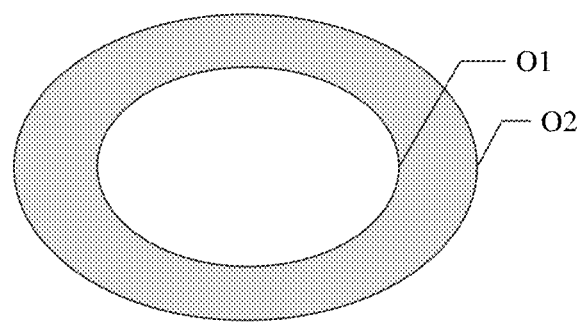
FIG. 11 schematically shows a schematic diagram of a falling point area according to an embodiment of the disclosure.

At S1010, an error range corresponding to the cleaning machine is acquired, and a falling point area corresponding to the cleaning machine is determined for the cleaning water column by using the error range. The error range is the same as the error range in operation S910 and will not be described in detail herein. A falling point area may be determined according to the error range. Since the falling point is almost impossible to be located exactly in a circular area centered on the center of the wafer, the falling point is located in an annular area around the center of the wafer. A circular area with a radius as a minimum value may be determined by the minimum value in the error range, a circular area with a radius as the maximum value may be determined by the maximum value in the error range, and an annular area between the two circular areas may serve as a normal falling point area. Based on the shooting angle of the camera with respect to the cleaning water column, the circular range of the falling point is actually an elliptical annular area in the image, as shown in FIG. 11. For example, assuming that an error range of the cleaning machine is converted to [−2, +6] in the coordinate system, the error range may be set for a certain cleaning machine, and different machine tables have different values. Then, the falling point area may be expressed as:

$$O1 = \frac{res[0]^2}{(b-2)^2} + \frac{res[1]^2}{(a-2)^2}, \text{ and } O2 = \frac{res[0]^2}{(b+6)^2} + \frac{res[1]^2}{(a+6)^2},$$

where res[0] and res[1] are x and y coordinates of the actual falling point, respectively. The elliptical annular areas indicated by O1 and O2 are the falling point areas.

At S1020, when the actual falling point is outside the falling point area, a corresponding image to be detected is taken as an anomalous image, and the target nozzle is determined according to the anomalous image.

After the coordinates of the actual falling point are detected by corner detection, the coordinates of the actual falling point may be substituted into the formulas $$O1 = \frac{res[0]^2}{(b-2)^2} + \frac{res[1]^2}{(a-2)^2}, O2 = \frac{res[0]^2}{(b+6)^2} + \frac{res[1]^2}{(a+6)^2},$$

and O1 and O2 are calculated. If the actual falling point is within the above falling point area, O1>=1, and O2⇐1. If it is calculated that O1<1 or O2>1, it may be determined that the image to be detected is an anomalous image. A nozzle corresponding to the anomalous image is a target nozzle.

Figure 12:
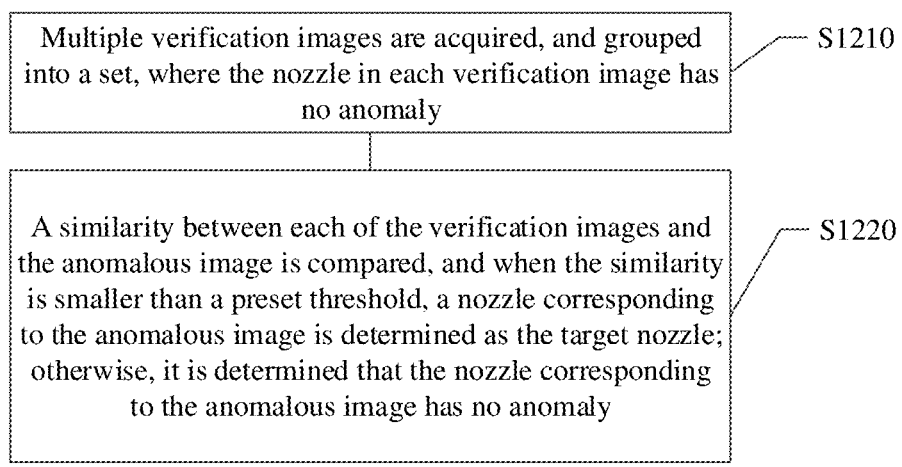
FIG. 12 schematically shows a flowchart of a method for detecting wafer cleaning anomalies according to an embodiment of the disclosure.

In an exemplary implementation, an anomaly image may also be verified to improve the accuracy of anomaly detection after the presence of a nozzle anomaly in the image is determined by the characteristics of contact. Specifically, as shown in FIG. 12 as follows.

At S1210, multiple verification images are acquired, and grouped into a set. The nozzle in each verification image has no anomaly. The cleaning process of a normal nozzle is photographed in advance, and multiple verification images may be obtained; or, multiple images of the cleaning process are acquired, and images in which the nozzle does not have an anomaly are selected manually as verification images. The verification images are stored in a set that may be continuously updated during subsequent detection to enhance the recall rate of data.

At S1220, a similarity between each of the verification images and the anomalous image is compared, and when the similarity is smaller than a preset threshold, a nozzle corresponding to the anomalous image is determined as the target nozzle; otherwise, it is determined that the nozzle corresponding to the anomalous image has no anomaly. Each anomalous image determined in the above operations is compared with the verification images in the set one by one, to calculate the similarity between the anomalous image and each verification image, if the similarity is greater than the preset threshold, it is determined that the anomalous image is misjudged, and if there is an anomalous image having the similarity less than the preset threshold, it may be determined that a nozzle corresponding to the anomalous image is a target nozzle. The preset threshold may be determined through the experience or experiment of an equipment engineer. For example, the preset threshold may be 0.8, 0.7, 0.88, 0.9, etc., which is not particularly limited in the present implementation.

At S330, when a target nozzle having the anomaly is detected, anomaly positioning information of the target nozzle is determined, and anomaly early-warning is performed by using the anomaly positioning information.

Figure 13:
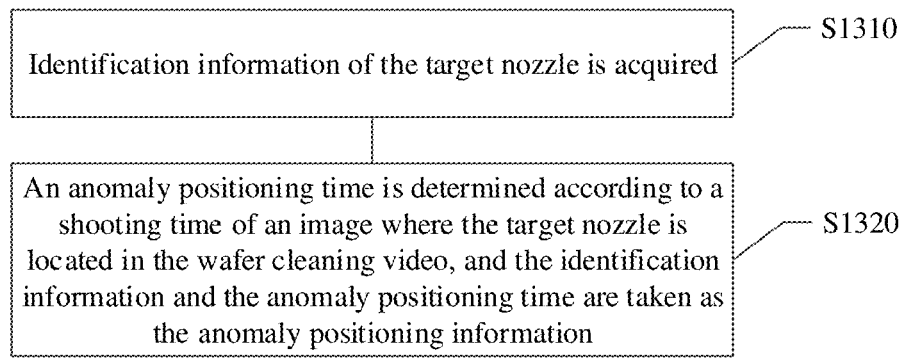
FIG. 13 schematically shows a flowchart of a method for detecting wafer cleaning anomalies according to another embodiment of the disclosure.

The anomaly positioning information may include identification information of a nozzle or identification information of a camera, it may also include time information of an anomalous target nozzle, and other information, such as cleaning machine information and wafer information, and it is not particularly limited in the present implementation. An image identifier of the anomalous image may be taken as the anomaly positioning information of the target nozzle. The image identifier of the anomalous image may be a camera number and shooting time information included in the image, such as 001, 2020-01-01. The operation of determining anomaly positioning information may specifically include the following operations S1310 and S1320, as shown in FIG. 13.

At S1310, identification information of the target nozzle is acquired. The identification information of the target nozzle may include a serial number of the target nozzle, it may also include an identifier of the cleaning machine, such as the name and ID of the cleaning machine, it may also include an identifier of the wafer cleaning video, such as a file directory of the wafer cleaning video and a video name, it is not particularly limited in the present implementation.

For example, each camera may correspond to a file directory, the captured video is uploaded into a corresponding file directory, and correspondences between the file directories and the cameras may be predetermined, so that the camera from which the image originates may be determined according to the file directory in which the image of the target nozzle is detected, and the file directory may be taken as identification information. When the file directories are constructed in advance, each file directory may be associated with the identifier of the nozzle. For example, file directories a/b/c/d correspond to nozzle 01, so that the identification information of the target nozzle may be determined according to the image of the detected target nozzle.

At S1320, an anomaly positioning time is determined according to a shooting time of an image where the target nozzle is located in the wafer cleaning video, and the identification information and the anomaly positioning time are taken as the anomaly positioning information. The camera may print time information on a shooting picture, perform text recognition on the image in which the target nozzle is detected, determine a shooting time in the image in which the target nozzle is detected, and take the shooting time as an anomaly positioning time. Alternatively, when performing image processing on the wafer cleaning video, a moment when each frame of image is in the time axis of the video may be determined, and a moment corresponding to the image where the target nozzle is located is an anomaly positioning time. After obtaining an anomaly positioning time of the image where the target nozzle is located, the anomaly positioning time and the identification information of the target nozzle may be packaged as anomaly positioning information.

Figure 14:
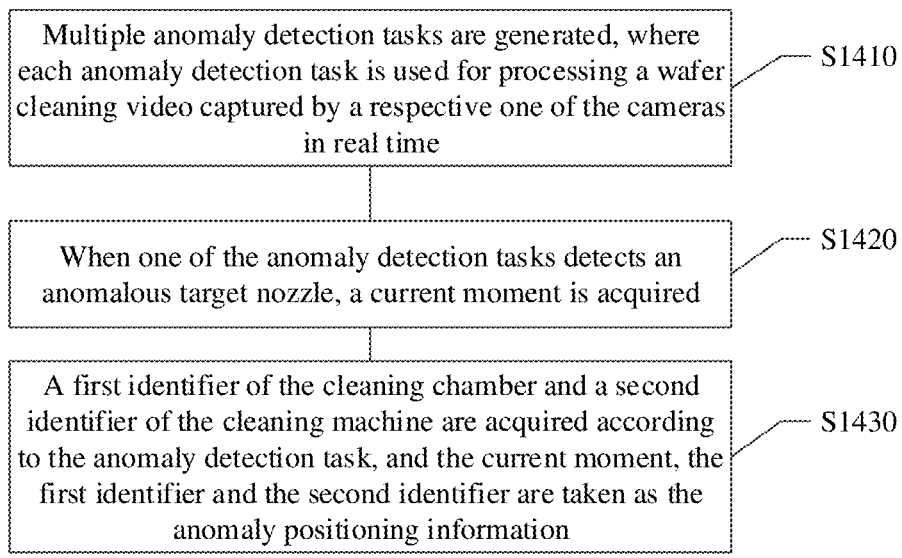
FIG. 14 schematically shows a flowchart of a method for detecting wafer cleaning anomalies according to yet another embodiment of the disclosure.

In an exemplary implementation, the operation of determining anomaly positioning information may specifically include the following operations S1410, S1420 and S1430, as shown in FIG. 14.

At S1410, multiple anomaly detection tasks are generated. Each anomaly detection task is used for processing a wafer cleaning video captured by a respective one of the cameras in real time. In the present implementation, wafer cleaning videos uploaded by multiple cameras may be processed simultaneously through multi-task parallel processing. Specifically, multiple anomaly detection tasks are generated, and each anomaly detection task is used for monitoring a wafer cleaning video of a respective one of the cameras, and is responsible for performing image processing on the wafer cleaning video to determine whether an anomaly exists.

At S1420, when one of the anomaly detection tasks detects an anomalous target nozzle, a current moment is acquired. The camera captures a wafer cleaning video in real time. For example, the captured monitoring pictures are uploaded to a designated file, the anomaly detection task may monitor the file in real time, and when a wafer cleaning video is uploaded to the file, the processing of the video is started. Since the anomaly detection task can process the video in real time, the current moment may be recorded when an anomalous target nozzle is detected. Since each anomaly detection task is only responsible for processing one wafer cleaning video, multiple anomaly detection tasks may be performed in parallel, and a time delay between the current moment and the camera shooting time can be reduced, so that the current moment is as close to the shooting time as possible.

At S1430, a first identifier of the cleaning chamber and a second identifier of the cleaning machine are acquired according to the anomaly detection task, and the current moment, the first identifier and the second identifier are taken as the anomaly positioning information. The first identifier may be serial number information of the cleaning chamber, and may also include the name of the cleaning chamber. A cleaning chamber in the cleaning machine may be uniquely identified according to the first identifier. The second identifier may include serial number information of the cleaning machine, and may also include the name of the cleaning machine. A cleaning machine may be uniquely identified according to the second identifier. Correspondences between each anomaly detection task and the first identifier and the second identifier may be determined in advance. For example, anomaly detection task 1 is responsible for processing the wafer cleaning video of cleaning chamber 01 and cleaning machine 02, and thus, the first identifier of the cleaning chamber and the second identifier of the cleaning machine corresponding to a target anomaly detection task that detects a target nozzle may be determined according to this correspondence. Thus, the first identifier, the second identifier and the current moment which correspond to the target anomaly detection task that detects the target nozzle are taken as anomaly positioning information, so as to directly position a nozzle having an anomaly and an anomaly occurrence time according to the anomaly positioning information.

Figure 15:
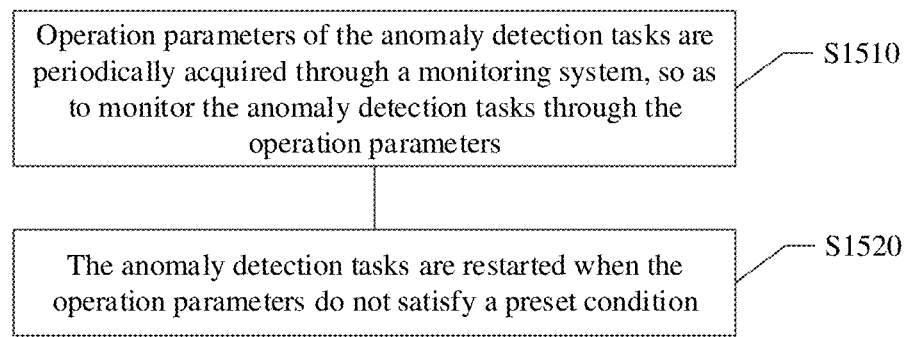
FIG. 15 schematically shows a flowchart of a method for detecting wafer cleaning anomalies according to an embodiment of the disclosure.

Since the detection of the wafer cleaning process is performed automatically, the present implementation further includes a monitoring system for monitoring the detection process so as to find problems in time. Specifically, the method includes operations S1510 and S1520, as shown in FIG. 15.

At S1510, operation parameters of the anomaly detection tasks are periodically acquired through a monitoring system, so as to monitor the anomaly detection tasks through the operation parameters. Specifically, the monitoring system may include one or more monitoring tasks, which may periodically acquire operation parameters of the anomaly detection tasks, and determine through the operation parameters whether the anomaly detection tasks are operating normally. There may be one or more operation parameters. Optionally, the operation parameters may include CPU usage, memory consumption, disk consumption, etc.

At S1520, the anomaly detection tasks are restarted when the operation parameters do not satisfy a preset condition. Each operation parameter may predetermine a preset condition, and if the operation parameter of the anomaly detection task acquired by the monitoring task satisfies the corresponding preset condition, it may be determined that the anomaly detection task operates normally. If an operation parameter that does not satisfy the corresponding preset condition is detected, it may be determined that the anomaly detection task operates anomalously. For example, if the preset condition for CPU usage is: when the CPU usage is 20%-80% and the CPU usage of the anomaly detection task obtained is 10%, it may be determined that the anomaly detection task does not satisfy the preset condition and operates anomalously. The anomaly detection tasks may be restarted by instructions when the operation parameters do not satisfy the preset condition.

The present implementation can automatically monitor the anomaly detection method, thereby further reducing the problem of detection errors and improving the accuracy of anomaly detection.

Figure 16:
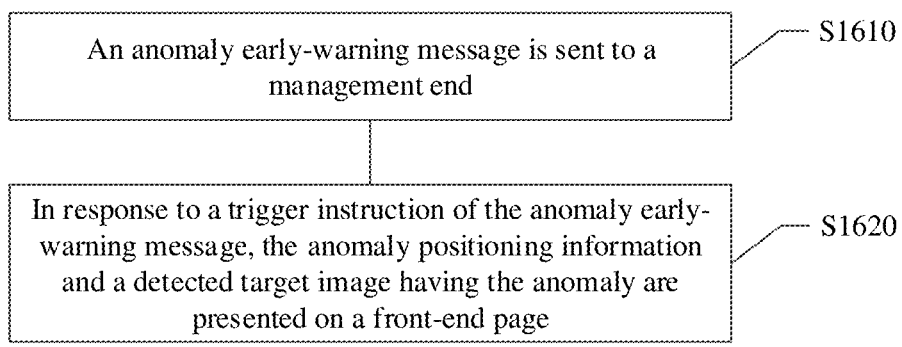
FIG. 16 schematically shows a flowchart of a method for detecting wafer cleaning anomalies according to a further embodiment of the disclosure.

By performing image processing on wafer cleaning videos of multiple cleaning machines, all target nozzles are determined, and the anomaly positioning information is sent to a terminal device of an equipment engineer to realize anomaly early-warning. The method of performing anomaly early-warning may specifically include the following operations S1610 and S1620, as shown in FIG. 16.

At S1610, an anomaly early-warning message is sent to a management end. The management end may include a terminal device used by an equipment engineer. The anomaly early-warning message may include anomaly positioning information, and the anomaly early-warning message may be sent to the management end in the form of an http request. For example, a server may store information such as an IP address of the management end and a user ID in advance, and send an anomaly early-warning message to the corresponding IP address when it is determined that a target nozzle having the anomaly is detected. In addition, the anomaly early-warning message may also be other types of information, such as a short message.

At S1620, in response to a trigger instruction of the anomaly early-warning message, the anomaly positioning information and a detected target image having the anomaly are presented on a front-end page. When the wafer cleaning video is subjected to image processing, if it is determined in an image that a nozzle has an anomaly, the image is determined as a target image, and the target image may be stored in a specified position, such as a private cloud disk. When the information is displayed on the front-end page, a corresponding image may be queried from the private cloud disk for display. For example, the trigger instruction may be a click operation, and when the click operation for the anomaly early-warning message is received, anomaly positioning information and the anomalous target image are displayed in the front-end page of the management end.

In the present implementation, the equipment engineer of the management end can quickly and clearly know the anomalous nozzle and the time when the anomaly occurs according to the visual front-end page without manually troubleshooting, which can improve the efficiency of anomaly detection and reduce the manpower cost. The equipment engineer can stop the anomalous nozzle in time, thereby preventing more yield loss.

Figure 17:
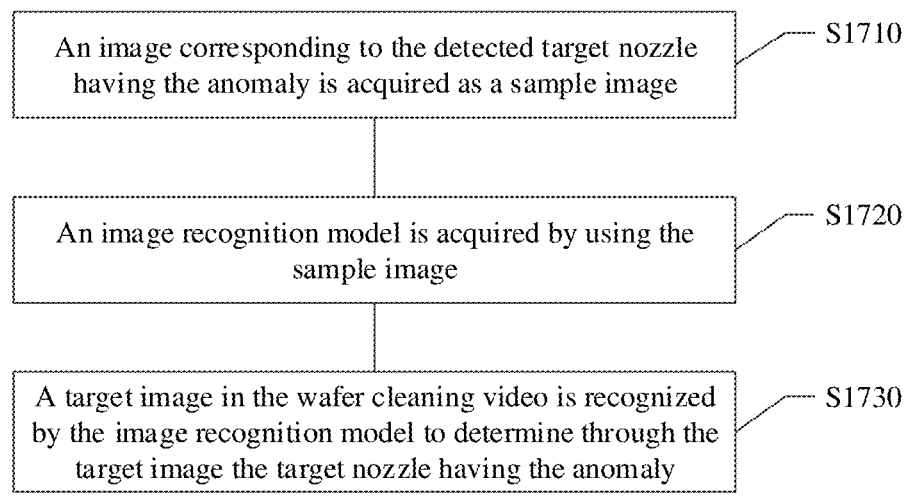
FIG. 17 schematically shows a flowchart of a method for detecting wafer cleaning anomalies according to an embodiment of the disclosure.

In an exemplary implementation, the efficiency of anomaly detection may be further accelerated by using a machine learning model. Specifically, as shown in FIG. 17 as follows.

At S1710, an image corresponding to the detected target nozzle having the anomaly is acquired as a sample image. After performing the method for detecting wafer cleaning anomalies described above in the disclosure for a period of time, a batch of images of target nozzles having anomalies may be accumulated, and the detected images may be stored as sample images. Moreover, some sample images may also be acquired by other means, for example, anomalous nozzles manually determined are photographed to obtain a sample image, and for another example, a large number of images of a wafer cleaning process are acquired, and the sample image having an anomaly are manually marked, etc. An image corresponding to a normal nozzle may be included in the sample image in addition to an image corresponding to an anomalous target nozzle. The image corresponding to the anomalous target nozzle may be taken as a negative sample, and the image of the normal nozzle may be taken as a positive sample.

At S1720, an image recognition model is acquired by using the sample image. The image recognition model may be constructed by various algorithms, such as a neural network model and a linear regression model. Specifically, the positive samples and the negative samples are taken as the inputs of the image recognition model, and corresponding outputs thereof are determined as respective labels. For example, the label of the positive samples may be positive, and the label of the negative samples may be negative, so as to establish mapping relationships between the inputs and the outputs, until the accuracy rate of the image recognition model meets the requirements, and a trained image recognition model is obtained. For example, each sample image is recognized by continuously adjusting the parameters of a function in OpenCV, and a recognition result of the sample image is determined to be positive or negative until an optimal parameter corresponding to the maximum accuracy is found, and the function relationship is a mapping relationship between an input and an output.

At S1730, a target image in the wafer cleaning video is recognized by the image recognition model to determine through the target image the target nozzle having the anomaly. After obtaining the image recognition model, the image recognition model may be used to continue the recognition of the wafer cleaning video, and the target image having the anomaly and the target nozzle corresponding to the target image may be recognized. In the present implementation, after an anomalous image is detected, the image may be used to train and optimize the image recognition model, so as to further improve the accuracy of anomaly detection.

Figure 18:
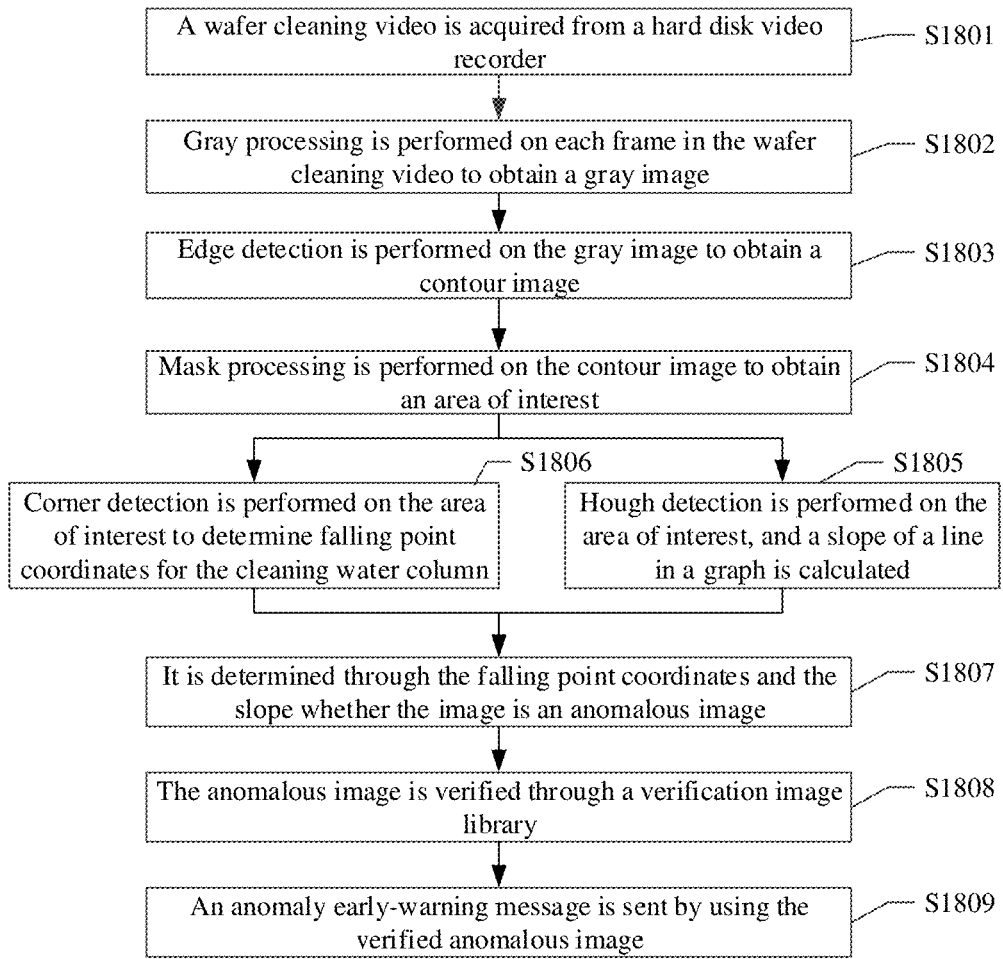
FIG. 18 schematically shows a flowchart of a method for detecting wafer cleaning anomalies according to a further embodiment of the disclosure.

In an exemplary implementation, the method for detecting wafer cleaning anomalies of the disclosure may include the following operations S1801 to S1809, as shown in FIG. 18.

With reference to FIG. 18, at S1801, a wafer cleaning video is acquired from a hard disk video recorder. A server may perform data transmission with the hard disk video recorder through a Real Time Streaming Protocol (RTSP) protocol, which is a real-time streaming protocol, and the video streaming content may be transmitted through the protocol in real time. At S1802, gray processing is performed on each frame in the wafer cleaning video to obtain a gray image. At S1803, edge detection is performed on the gray image to obtain a contour image. At S1804, mask processing is performed on the contour image to obtain an area of interest, which may be an area where a cleaning water column contacts a wafer. Contour information of the cleaning water column and contour information of the wafer may be included therein. At S1805, Hough detection is performed on the area of interest, and a slope of a line in a graph is calculated. At S1806, corner detection is performed on the area of interest to determine falling point coordinates for the cleaning water column. At S1807, it is determined through the falling point coordinates and the slope whether the image is an anomalous image. Specifically, if the falling point coordinates are not in a falling point area and the slope is not within a tolerance interval, the image may be determined as an anomalous image; alternatively, the image is determined as an anomalous image when one of the falling points coordinates and the slope does not meet the requirements. At S1808, the anomalous image is verified through a verification image library. Specifically, the verification image library includes multiple verification images, which are images of a normal cleaning process. A similarity between each of the verification images and the anomalous image is calculated, if the similarity is less than a preset threshold, it is determined that the verification passes, if the similarity is greater than the preset threshold, it is determined that the verification fails, and the anomalous image belongs to false warning. At S1809, an anomaly early-warning message is sent by using the verified anomalous image. In addition, anomalous images that fail the verification may be filtered.

Figure 19:
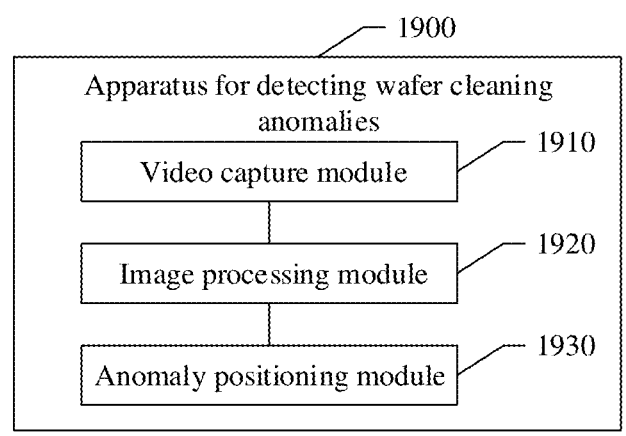
FIG. 19 schematically shows a block diagram of an apparatus for detecting wafer cleaning anomalies according to an embodiment of the disclosure.

The following describes apparatus embodiments of the disclosure that may be used to perform the above method for detecting wafer cleaning anomalies of the disclosure. With reference to FIG. 19, an apparatus 1900 for detecting wafer cleaning anomalies provided by an embodiment of the disclosure may include a video capture module, an image processing module and an anomaly positioning module.

The video capture module 1910 is configured to capture a wafer cleaning video in real time through a plurality of cameras of cleaning machines. Each camera corresponds to a respective cleaning chamber of one of the cleaning machines, and each cleaning chamber contains a nozzle.

The image processing module 1920 is configured to perform image processing on each frame of image contained in the wafer cleaning video to obtain characteristics of contact between a cleaning water column dispensed from the nozzle and a wafer in the image, and determine through the characteristics of contact whether the nozzle has an anomaly.

The anomaly positioning module 1930 is configured to determine, when an anomalous target nozzle is detected, anomaly positioning information of the target nozzle, and perform anomaly early-warning by using the anomaly positioning information.

In the apparatus for detecting wafer cleaning anomalies provided by the exemplary implementation of the disclosure, on the one hand, wafer cleaning videos of the cleaning machines are captured by the cameras, and it is determined through the recognition of the wafer cleaning videos whether the nozzles of the cleaning machines have any anomalies, so as to automatically detect the target nozzles having the anomalies, thereby avoiding the waste of manpower and time caused by manual troubleshooting and improving the efficiency of troubleshooting. On the other hand, according to anomaly positioning information of the anomalous target nozzles, faults may be handled in time to prevent more yield loss. Furthermore, the embodiments of the disclosure can conduct a more comprehensively detection of the cleaning machines, thereby enabling precise control of the wafer cleaning process, and facilitating the improvement of chip yield.

In an exemplary implementation of the disclosure, the image processing module 1920 includes: an image extraction module, configured to acquire an image to be detected from the wafer cleaning video; a contour extraction module, configured to perform edge detection on the images to be detected to obtain contour features of the cleaning water column dispensed from the nozzle and the wafer; and a feature calculation module, configured to calculate the characteristics of contact between the cleaning water column and the wafer in the images to be detected by using the contour features.

In an exemplary implementation of the disclosure, the contour extraction module includes: a gray processing module, configured to perform gray processing on each image to be detected to obtain a processed first image; a binarization processing module, configured to perform binarization processing on the first image to obtain a processed second image; a mask processing module, configured to perform mask processing on the second image to obtain a target area including the cleaning water column dispensed from the nozzle and the wafer; and an edge detection module, configured to perform edge detection on the target area to obtain contour features of the cleaning water column and the wafer.

In an exemplary implementation of the disclosure, the feature calculation module is configured to calculate a slope of the cleaning water column in each image to be detected by using the contour features to obtain the characteristics of contact.

In an exemplary implementation of the disclosure, the feature calculation module is configured to calculate an actual falling point of the cleaning water column on the wafer in each image to be detected by using the contour features to obtain the characteristics of contact.

In an exemplary implementation of the disclosure, the image processing module 1920 includes: a slope range determination module, configured to acquire an error range corresponding to the cleaning machine, and determine a tolerance interval of the slope of the cleaning water column by using the error range; and a first anomalous image acquisition module, configured to take, when the slope of the cleaning water column is outside the tolerance interval, a corresponding image to be detected as an anomalous image, and determine the target nozzle according to the anomalous image.

In an exemplary implementation of the disclosure, the image processing module 1920 includes: a falling point range determination module, configured to acquire an error range corresponding to the cleaning machine, and determine, for the cleaning water column, a falling point area corresponding to the cleaning machine by using the error range; and a second anomalous image acquisition module, configured to take, when the actual falling point is outside the falling point area, a corresponding image to be detected as an anomalous image, and determine the target nozzle according to the anomalous image.

In an exemplary implementation of the disclosure, the first anomalous image acquisition module or the second anomalous image acquisition module includes: a verification image acquisition module, configured to acquire multiple verification images, and group the multiple verification images into a set, where the nozzle in each verification image has no anomaly; and a verification module, configured to compare a similarity between each of verification images and the anomalous image, and when the similarity is smaller than a preset threshold, a nozzle corresponding to the anomalous image is determined as the target nozzle; otherwise, determine that the nozzle corresponding to the anomalous image has no anomaly.

In an exemplary implementation of the disclosure, the anomaly positioning module 1930 includes: an identification acquisition module, configured to acquire identification information of the target nozzle; and a time determination module, configured to determine an anomaly positioning time according to a shooting time of an image where the target nozzle is located in the wafer cleaning video, and take the identification information and the anomaly positioning time as the anomaly positioning information.

In an exemplary implementation of the disclosure, the anomaly positioning module 1930 includes: an early-warning module, configured to send an anomaly early-warning message to a management end; and an anomaly display module, configured to present, in response to a trigger instruction of the anomaly early-warning message, the anomaly positioning information and a detected target image having the anomaly on a front-end page.

In an exemplary implementation of the disclosure, the anomaly positioning module 1930 includes: a multi-task generation module, configured to generate multiple anomaly detection tasks, each anomaly detection task being used for processing a wafer cleaning video captured by a respective one of the cameras in real time; an anomalous moment determination module, configured to acquire, when one of the anomaly detection tasks detects an anomalous target nozzle, a current moment; and a positioning information determination module, configured to acquire a first identifier of the cleaning chamber and a second identifier of the cleaning machine according to the anomaly detection task, and the current moment, the first identifier and the second identifier are taken as the anomaly positioning information.

In an exemplary implementation of the disclosure, the apparatus 1900 for detecting wafer cleaning anomalies further includes: a monitoring module, configured to periodically acquire operation parameters of the anomaly detection tasks through a monitoring system so as to monitor the anomaly detection tasks through the operation parameters; and a restart module, configured to restart the anomaly detection tasks when the operation parameters do not satisfy a preset condition.

In an exemplary implementation of the disclosure, the operation parameters include CPU usage, memory consumption, and disk consumption.

In an exemplary implementation of the disclosure, the apparatus 1900 for detecting wafer cleaning anomalies further includes: a sample acquisition module, configured to acquire an image corresponding to the detected target nozzle having the anomaly as a sample image; a model construction module, configured to acquire an image recognition model by using the sample image; and a model recognition module, configured to recognize a target image in the wafer cleaning video by the image recognition model to determine the target nozzle having the anomaly through the target image.

Since various functional modules of the apparatus for detecting wafer cleaning anomalies according to an exemplary embodiment of the disclosure corresponds to the operations of the exemplary embodiment of the above method for detecting wafer cleaning anomalies, the details which are not disclosed in the apparatus embodiments of the disclosure are referred to the above embodiments of the method for detecting wafer cleaning anomalies according to the disclosure.

Figure 20:
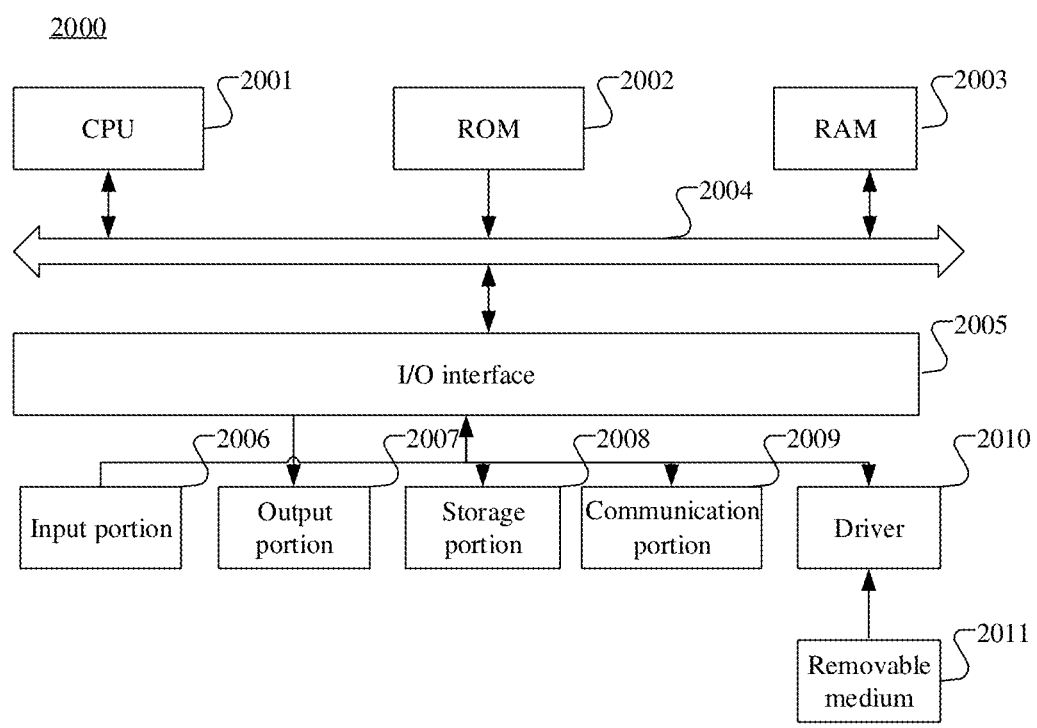
FIG. 20 shows a schematic structure diagram of a computer system suitable for implementing an electronic device according to an embodiment of the disclosure.

Reference is now made to FIG. 20, which shows a schematic structure diagram of a computer system 2000 suitable for implementing an electronic device according to an embodiment of the disclosure. The computer system 2000 of the electronic device shown in FIG. 20 is merely an example, and should not impose any limitation on the function and scope of use of the embodiments of the disclosure.

As shown in FIG. 20, the computer system 2000 includes a central processing unit (CPU) 2001, which may perform various appropriate actions and processes according to a program stored in a Read-Only Memory (ROM) 2002 or a program loaded into a Random Access Memory (RAM) 2003 from a storage portion 2008. In the RAM 2003, various programs and data required for the system operation are also stored. The CPU 1201, the ROM 2002, and the RAM 2003 are connected to each other through a bus 2004. An Input/output (I/O) interface 2005 is also connected to the bus 2004.

The following components are connected to the I/O interface 2005: an input portion 2006 including a keyboard, a mouse, and the like; an output portion 2007 including a Cathode-Ray Tube (CRT), a Liquid Crystal Display (LCD), a speaker, and the like; a storage portion 2008 including a hard disk; and a communication portion 2009 including a network interface card such as a Local Area Network (LAN) card, a modem, and the like. The communication portion 2009 performs communication processing via a network such as the Internet. A driver 2010 is also connected to the I/O interface 2005 as needed. A removable medium 2011, such as a magnetic disk, an optical disk, a magneto-optical disk, and a semiconductor memory, is installed on the driver 2010 as needed, so that a computer program read therefrom is installed into the storage portion 2008 as needed.

In particular, according to an embodiment of the disclosure, the process described above with reference to the flowchart may be implemented as a computer software program. For example, an embodiment of the disclosure includes a computer program product including a computer program carried on a computer-readable medium, the computer program containing a program code for performing the method shown in the flowchart. In such an embodiment, the computer program may be downloaded and installed from the network through the communication portion 2009, and/or installed from the removable medium 2011. When the computer program is executed by the CPU 2001, the above functions defined in the system of the disclosure are executed.

It is to be noted that the computer-readable medium of the disclosure may be a computer-readable signal medium or a computer-readable storage medium or any combination of the foregoing. The computer-readable storage medium may be, for example, but not limited to, an electronic, magnetic, optical, electromagnetic, infrared, or semiconductor system, apparatus, or device, or any combination thereof. More specific examples of the computer-readable storage medium may include, but is not limited to: an electric connection portion with one or more wires, a portable computer disk, a hard disk, a RAM, a ROM, an Erasable Programmable ROM (EPROM) (or flash memory), an optical fiber, a portable CD-ROM, an optical storage device, a magnetic storage device, or any suitable combination of the foregoing. In the disclosure, the computer-readable storage medium may be any tangible medium that contains or stores a program that may be used by or in combination with an instruction execution system, apparatus, or device. In the disclosure, the computer-readable signal medium may include a data signal that is propagated in a baseband or as part of a carrier, carrying computer-readable program codes. Such propagated data signals may take a variety of forms including, but not limited to, electromagnetic signals, optical signals, or any suitable combination of the foregoing. The computer-readable signal medium may also be any computer-readable medium other than a computer-readable storage medium, and the computer-readable medium may send, propagate, or transmit a program for use by or in connection with an instruction execution system, apparatus, or device. Program codes contained in the computer-readable medium may be transmitted by any suitable medium, including but not limited to wireless, wire, optical cable, RF, etc., or any suitable combination of the foregoing.

The flowcharts and block diagrams in the accompanying drawings illustrate the architecture, functionality, and operation of possible implementations of systems, methods and computer program products according to various embodiments of the disclosure. In this regard, each block in the flowcharts or block diagrams may represent a module, a program segment, or a portion of code, which contains one or more executable instructions for implementing a specified logical function. It is also to be noted that in some alternative implementations, the functions indicated in the blocks may also occur in a different order than that indicated in the accompanying drawings. For example, two successively represented blocks may actually be executed substantially in parallel, and they may sometimes be executed in the reverse order, depending on the functions involved. It is further to be noted that each block in the block diagrams and/or the flowcharts and a combination of the blocks in the block diagrams and/or the flowcharts may be implemented by a dedicated hardware-based system configured to execute a specified function or operation or may be implemented by a combination of a special hardware and a computer instruction.

The units described as involved in the embodiments of the disclosure may be implemented by means of software, or may be implemented by means of hardware. The units described may also be arranged in the processor. The names of the units do not, in some cases, constitute definitions of these units.

As another aspect, the disclosure also provides a computer-readable medium, which may be included in the electronic device described in the above embodiments, or may exist alone without being assembled into the electronic device. The computer-readable storage medium carries one or more programs. When the one or more programs are executed by the electronic device, the electronic device implements the method for determining effectiveness of epidemic prevention and control as described in the above embodiments.

For example, the electronic device may implement the operations shown in FIG. 3. At S310, a wafer cleaning video is captured in real time through each of multiple cameras of cleaning machines. Each camera corresponds to a respective cleaning chamber of one of the cleaning machines, and each cleaning chamber contains a nozzle. At S320, image processing is performed on each frame of image contained in the wafer cleaning video to obtain characteristics of contact between a cleaning water column dispensed from the nozzle and a wafer in the image, and it is determined through the characteristics of contact whether the nozzle has an anomaly. At S330, when an anomalous target nozzle is detected, anomaly positioning information of the target nozzle is determined, and anomaly early-warning is performed by using the anomaly positioning information.

As another example, the electronic device may implement the various operations shown in FIGS. 4-18.

It is to be noted that although several modules or units of the device for action execution are mentioned in the above detailed description, such division is not mandatory. In fact, according to the implementations of the disclosure, the features and functions of two or more modules or units described above may be embodied in one module or unit. Conversely, the features and functions of one module or unit described above may be further divided to be specified by multiple modules or units.

Through the description of the above implementations, those skilled in the art will readily understand that the example implementations described herein may be implemented by means of software or by means of software in combination with necessary hardware. Therefore, the technical solution according to the embodiment of the disclosure may be embodied in the form of a software product, which may be stored in a non-volatile storage medium (which may be a CD-ROM, a USB flash drive, a removable hard disk, etc.) or on a network. A number of instructions are included to cause a computing device (which may be a personal computer, a server, a touch terminal, or a network device, etc.) to perform a method in accordance with an embodiment of the disclosure.

Other embodiments of the disclosure will be apparent to those skilled in the art after considering the specification and practicing the disclosure herein. The disclosure is intended to cover any variations, uses, or adaptations of the disclosure, which are in accordance with the general principles of the disclosure and include common general knowledge or conventional technical means in the art that are not disclosed in the disclosure. The specification and examples are considered exemplary only, and the true scope and spirit of the disclosure are indicated by the following claims.

It is to be understood that the disclosure is not limited to the accurate structure that have been described and shown in the accompanying drawings, and that various modifications and variations may be made without departing the scope thereof. The scope of the disclosure is limited only by the appended claims.

The invention claimed is:

1. A method for detecting wafer cleaning anomalies, comprising:
capturing a wafer cleaning video in real time through each of a plurality of cameras of cleaning machines, wherein each camera corresponds to a respective cleaning chamber of the one of the cleaning machines, and each cleaning chamber contains a nozzle;
performing image processing on each frame of image contained in the wafer cleaning video to obtain characteristics of contact between a cleaning water column dispensed from the nozzle and a wafer in the image, and determining through the characteristics of contact whether the nozzle has an anomaly; and
when a target nozzle having the anomaly is detected, determining anomaly positioning information of the target nozzle, and performing anomaly early-warning by using the anomaly positioning information;
wherein
the performing image processing on each frame of image contained in the wafer cleaning video to obtain characteristics of contact between a cleaning water column dispensed from the nozzle and a wafer in the image comprises:
acquiring images to be detected from the wafer cleaning video;
performing edge detection on the images to be detected to obtain contour features of the cleaning water column dispensed from the nozzle and the wafer; and
calculating the characteristics of contact between the cleaning water column and the wafer in the images to be detected by using the contour features;
wherein
the calculating the characteristics of contact between the cleaning water column and the wafer in the images to be detected by using the contour features comprise:
calculating a slope of the cleaning water column in each image to be detected by using the contour features to obtain the characteristics of contact.

2. The method of claim 1, wherein
the performing edge detection on the images to be detected to determine contour features of the cleaning water column dispensed from the nozzle and the wafer comprises:
performing gray processing on each image to be detected to obtain a processed first image;
performing binarization processing on the processed first image to obtain a processed second image;
performing mask processing on the processed second image to obtain a target area including the cleaning water column dispensed from the nozzle and the wafer; and
performing edge detection on the target area to obtain contour features of the cleaning water column and the wafer.

3. The method of claim 1, wherein
the calculating the characteristics of contact between the cleaning water column and the wafer in the images to be detected by using the contour features comprises:
calculating an actual falling point of the cleaning water column on the wafer in each image to be detected by using the contour features to obtain the characteristics of contact.

4. The method of claim 1, wherein
the determining through the characteristics of contact whether the nozzle has an anomaly comprises:
acquiring an error range corresponding to the cleaning machine, and determining a tolerance interval of the slope of the cleaning water column by using the error range; and
when the slope of the cleaning water column is outside the tolerance interval, taking a corresponding image to be detected as an anomalous image, and determining the target nozzle according to the anomalous image.

5. The method of claim 1, further comprising:
acquiring an image corresponding to the detected target nozzle having the anomaly as a sample image;
acquiring an image recognition model by using the sample image; and
recognizing a target image in the wafer cleaning video by the image recognition model to determine the target nozzle having the anomaly through the target image.

6. An apparatus for detecting wafer cleaning anomalies, comprising:
a video capture circuit, configured to capture a wafer cleaning video in real time through each of a plurality of cameras of cleaning machines, wherein each camera corresponds to a respective cleaning chamber of one of the cleaning machines, and each cleaning chamber contains a nozzle;
an image processing circuit, configured to perform image processing on each frame of image contained in the wafer cleaning video to obtain characteristics of contact between a cleaning water column dispensed from the nozzle and a wafer in the image, and determine through the characteristics of contact whether the nozzle has an anomaly; and
an anomaly positioning circuit, configured to determine, when a target nozzle having the anomaly is detected, anomaly positioning information of the target nozzle, and perform anomaly early-warning by using the anomaly positioning information;
wherein
the performing image processing on each frame of image contained in the wafer cleaning video to obtain characteristics of contact between a cleaning water column dispensed from the nozzle and a wafer in the image comprises:
acquiring images to be detected from the wafer cleaning video;
performing edge detection on the images to be detected to obtain contour features of the cleaning water column dispensed from the nozzle and the wafer; and
calculating the characteristics of contact between the cleaning water column and the wafer in the images to be detected by using the contour features;
wherein
the calculating the characteristics of contact between the cleaning water column and the wafer in the images to be detected by using the contour features comprise:
calculating a slope of the cleaning water column in each image to be detected by using the contour features to obtain the characteristics of contact.

7. An electronic device, comprising:
a processor; and
a memory configured to store instructions executable by the processor,
wherein the processor is configured to:
capture a wafer cleaning video in real time through each of a plurality of cameras of cleaning machines, wherein each camera corresponds to a respective cleaning chamber of the one of the cleaning machines, and each cleaning chamber contains a nozzle;

perform image processing on each frame of image contained in the wafer cleaning video to obtain characteristics of contact between a cleaning water column dispensed from the nozzle and a wafer in the image, and determine through the characteristics of contact whether the nozzle has an anomaly; and when a target nozzle having the anomaly is detected, determine anomaly positioning information of the target nozzle, and perform anomaly early-warning by using the anomaly positioning information;

wherein the performing image processing on each frame of image contained in the wafer cleaning video to obtain characteristics of contact between a cleaning water column dispensed from the nozzle and a wafer in the image comprises:

acquiring images to be detected from the wafer cleaning video;

performing edge detection on the images to be detected to obtain contour features of the cleaning water column dispensed from the nozzle and the wafer; and calculating the characteristics of contact between the cleaning water column and the wafer in the images to be detected by using the contour features;

wherein the calculating the characteristics of contact between the cleaning water column and the wafer in the images to be detected by using the contour features comprise:

calculating a slope of the cleaning water column in each image to be detected by using the contour features to obtain the characteristics of contact.

8. A non-transitory computer-readable storage medium having stored thereon computer-executable instructions that, when executed by a processor, cause the processor to perform the method for detecting wafer cleaning anomalies of claim 1.

* * * * *